Nov. 17, 1953  R. P. HOKE ET AL  2,659,545
FISHING REEL
Filed Jan. 11, 1950
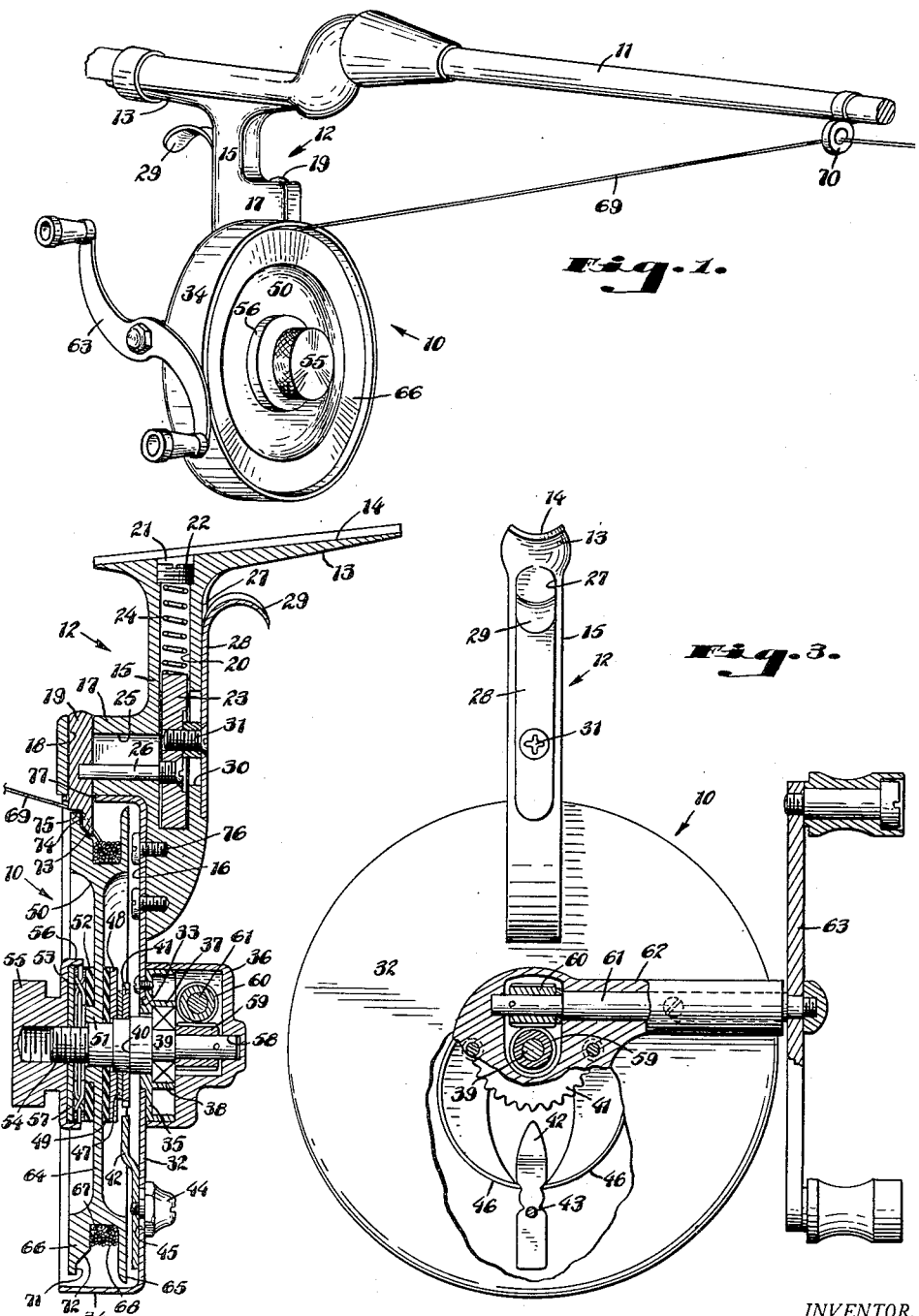
INVENTOR.
RICHARD PATRICK HOKE and
WILLIAM EDWARD BROWN,
BY:
Harold B. Hood
ATTORNEY.

Patented Nov. 17, 1953

2,659,545

UNITED STATES PATENT OFFICE 2,659,545

FISHING REEL

Richard Patrick Hoke and William Edward Brown, Shelburn, Ind., assignors to Clyde D. Shelburne, Shelburn, Ind.

Application January 11, 1950, Serial No. 138,028

6 Claims. (Cl. 242—84.6)

The present invention relates to a fishing reel, and is primarily concerned with the provision of improvements in the construction, mounting, and operation of spinner-type reels. The primary object of the invention is to provide a spinner-type reel and mounting therefor including a rotary spool, means for supporting the spool from a fishing rod, and a pickup finger movable into and out of cooperative relation with the spool to provide for axial stripping of a line from the spool, without rotation of the spool, in retracted position of the pickup finger, and for gathering the line onto the spool, upon rotation of the spool, when the finger is in projected position. A further object of the invention is to provide conveniently located actuating means, of novel construction, for controlling the position of the pickup finger. A further object of the invention is to provide a novel form of pickup finger and a novel shape of spool flange for improved cooperation between the finger and the flange.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a perspective view of a reel and supporting means, constructed in accordance with the present invention, shown in operative association with a standard form of fishing rod;

Fig. 2 is a vertical section therethrough, taken upon an enlarged scale; and

Fig. 3 is a rear elevation thereof, parts being broken away or shown in section for clarity of illustration.

Referring more particularly to the drawings, it will be seen that we have shown a reel, indicated generally by the reference numeral 10, dependently supported from a fishing rod 11 through the medium of a bracket, indicated generally by the reference numeral 12, and provided at one end with a saddle 13 formed to provide a longitudinally extending, transversely curved seating surface 14. The saddle 13 will be secured in place on the rod 11 by any suitable attaching means, which may be of conventional construction.

Projecting from that surface of the saddle 13 opposite the curved surface 14 and, in the illustrated arrangement of the assembly, depending therefrom, the bracket 12 is formed to provide an elongated neck 15 which, near its lower end, is formed with a forwardly-facing, plane surface 16 for a purpose later to be explained. Intermediate its ends, the neck 15 is formed to provide a forwardly-projecting nose 17 in which is formed a guideway 18 substantially parallel with the length of the neck 15, and located near the forward extremity of the nose 17. A pickup finger 19 is reciprocably guided in the guideway 18, and will be described in detail hereinafter.

A socket or guideway 20 extends longitudinally of the neck 15, having a mouth 21 at its upper end preferably opening through the surface 14 of the saddle 13; and a threaded closure plug 22 is seated in the mouth 21 of the guideway 20. A plunger 23 is reciprocably received in the guideway 20, a coiled spring 24 being confined between said plunger and the plug 22 to urge the plunger 23 always toward the lower limit of its path of reciprocation. A passageway 25, elongated in the direction of movement of the plunger 23 and the finger 19, provides communication between the guideways 18 and 20; and a pin 26, located in said passage, provides a driving connection between the plunger 23 and the finger 19.

On its rear surface, the neck 15 is formed with a slideway 27 in which is slidably mounted a plate 28, having a curved finger piece or trigger 29 at its upper end adjacent the saddle 13; and a slot 30, elongated in the direction of length of the neck 15, opens through said slideway 27 and communicates with the guideway 20. A screw 31, or other equivalent means, located in the slot 30, provides a driving connection between the plate 28 and the plunger 23, and concurrently secures said plate 28 in the slideway 27.

It will be clear, from an inspection of the drawings, that the trigger 29 is located in a position in which it may be conveniently engaged by the forefinger of a fisherman grasping the handle of the rod 11, and so that, by a gripping action, the fisherman may move the finger piece or trigger 29 toward the saddle 13, carrying with it the plunger 23 and the finger 19, and compressing the spring 24. Whenever the finger piece 29 is released, the spring 24 will shift the plunger 23 and the finger 19 to the positions illustrated.

The reel 10 comprises a base or shell 32 formed with a central opening 33 therethrough and provided with a peripheral, axially-extending, continuous flange 34. A bearing housing 35 is provided with an axially-extending hub snugly receivable in the opening 33, and is adapted to be secured to the rear face of the base 32 by means of screws, as illustrated, or other suitable fastening means. A cover 36 sleeves over the housing 35 and cooperates therewith to define a gear box.

Within a flange 37 of the bearing housing, there is supported an anti-friction bearing 38 of suitable construction; and a shaft 39 is journalled and supported in said bearing 38, projecting in opposite directions therefrom. One part of the shaft 39 projects through the opening 33 in the base 32 and extends axially for a substantial distance beyond the inner face of said base.

Just beyond that inner face, the shaft 39 is provided with an outwardly-facing shoulder 40 against which butts a clicker disc 41 sleeved on the shaft. A clicker finger 42 is pivotally mounted upon a pin 43 carrying a button 44 abutting the rear surface of the base 32, said pin extending through a slot 45 substantially radially arranged in said base. Spring means 46 resist oscillation of the finger 42 about the pin 43; and the clicker finger assembly is, of course, shiftable into and out of cooperative relation with the teeth of the disc 41, substantially in accordance with conventional practice.

A washer 47 is interposed between the disc 41 and a backer washer 48 for a friction clutch disc 49 which is sleeved on the shaft 40. A spool 50 is loosely sleeved on the shaft 40, directly adjacent the friction disc 49, and is provided with a short hub 51 projecting axially away from the disc 49. Sleeved on that hub is a second friction disc 52 against the outer surface of which bears a spring washer 53. The outer extremity of the shaft 40 is threaded as at 54, and a nut 55 having a knurled head is threadedly mounted on the threaded extension 54. Said nut is formed to provide an axially-extending annular flange 56 which enshrouds, and forms a supporting bearing for, the spring washer 53. Preferably, a slip washer 57 will be interposed between the spring washer 53 and the adjacent face of the nut 55.

It will be clear that, except for the effect of the friction discs thereon, the spool 50 is loose on the shaft 39. A driving connection, of variable effect, can be established between the shaft and the spool by tightening the nut 55 to increase the force with which the spring washer 53 resiliently presses the disc 52 against the web 64 of the spool 50, and resiliently presses said web against the disc 49 which, in turn, is backed by the washer 48 held against movement toward the base 32 by the washer 47 and disc 41 which, in turn, engages the shouldder 40 on the shaft.

The cover 36 is preferably formed with a bearing socket 58 in which is supported the extremity of the rearwardly-projecting portion of the shaft 39; and a gear element 59 is fixedly mounted on such rearwardly-projecting portion of said shaft within the gear box. A gear element 60, meshing with the element 59, is fixed to a shaft 61 which, in turn, is journalled in a lateral extension 62 of the cover 36, and carries a crank 63 at its outer end, spaced from the periphery of the base 32. Obviously, rotation of the crank 63 will drive the shaft 39.

At the periphery of the web 64, the spool 50 is provided with two axially spaced, radially-extending, peripherally continuous flanges 65 and 66 defining therebetween a channel 67 for storage of line 68. A section 69 of the line 68 will lead axially outwardly, between the flange 66 and the shroud or flange 34 of the base 32, and through one or more eyes 70 carried by the rod 11. Threading of the line through the eyes 70, of course, tends to incline the section 69 radially outwardly into substantial contact with the forward edge of the shroud 34.

The rearwardly-facing surface of the flange 66 is formed to provide a radially short peripheral surface 71 parallel with the base 32, and, extending from the root of the surface 71, a radially inwardly and rearwardly inclined surface 72. The inner end or nose of the pickup finger 19 is formed to provide an inclined surface 73 parallel with the surface 72, a surface 74 parallel with the surface 71, and a surface 75 substantially concentric with the axis of the shaft 39, overlying the periphery of the flange 66, and preferably projecting axially somewhat beyond the forward end of the spool 50. This arrangement of relatively inclined surfaces on the nose of the pickup finger, parallel with corresponding surfaces on the spool flange 66, efficiently guards against the possibility of slippage of the line past the pickup finger, when that finger is in projected position, even though the nose of the pickup finger may be spaced slightly from actual contact with the spool flange. Thus, manufacturing tolerances may be somewhat relaxed, since the surfaces 73 and 75 may be spaced several thousandths of an inch from the corresponding surfaces of the flange 66 while yet effectively guarding against slippage of the line past the finger.

The reel 10 is supported from the bracket 12 by screws 76, or the like, taking into the lower end of the neck 15 and clamping the plane rear surface of a section of the base against the plane, forwardly presented face 16 of said neck. At a suitable point in its periphery, and close to its forward edge, the shroud 34 is formed with a port 77, registering with the guideway 13 when the parts are assembled, to permit passage of the pickup finger 19 therethrough.

With the parts in assembled condition, the fisherman will squeeze on the trigger 29 to retract the pickup finger 19, and, holding the parts in that position, will make his cast. The line 68 will be freely stripped from the spool, whipping through the annular space between the periphery of the flange 66 and the shroud 34. Immediately upon completion of the cast, the fisherman will release the trigger 29, whereupon the spring 24 will shift the plunger 23 and the finger 19 to their illustrated positions, in which the nose of the finger 19 will block the above-described annular passage. Rotation of the crank 63 will now spin the shaft 39 to rotate the spool 50, whereby the line 68 will be laid in the channel 67. Adjustment of the nut 55 will determine the degree of recovering force which can be applied to the line 68 through the crank 63.

We claim as our invention:

1. In combination, a fishing reel having a base, a spool, means supporting said spool from said base for rotation about its own axis, bracket means including a saddle adapted to be seated on a fishing rod, means connecting said bracket means to support said base, a pick-up finger shiftably supported in said bracket means for movement into and out of cooperative relation with the periphery of said spool, plunger means shiftably mounted in said bracket means, means providing an operative connection between said plunger means and said finger, spring means acting on said plunger means and resiliently urging the same toward one limit of its path of movement, and a finger piece, slidably supported on said bracket means, operatively connected to move said plunger means and said finger, disposed near said saddle, and movable toward said saddle to shift said plunger means against the tendency of said spring means.

2. In combination, a bracket including a saddle adapted to be seated on a fishing rod, a discoid base supported from said saddle in a plane tansverse to the length of said saddle, said base having an axially-extending peripheral flange or shroud, a spool, means supporting said spool from said base for rotation about its own axis, said shroud overhanging the periphery of said spool, said bracket providing, outside said shroud, a rectilinear guideway substantially radially related to said spool, a pickup finger mounted in said guideway for reciprocation into and out of cooperative relation with the periphery of said spool, plunger means housed in said bracket and connected to move with said finger, resilient means acting on said plunger means to urge said finger toward said spool periphery, and a finger piece supported on said bracket near said saddle, operatively connected to shift said plunger and pickup finger, and movable toward said saddle to shift said plunger against the tendency of said resilient means.

3. An attachment bracket for mounting a reel on a fishing rod, comprising a saddle elongated forwardly and rearwardly and having a transversely-curved, longitudinally-extending surface adapted to be seated on a rod, a neck projecting from the surface of said saddle opposite said curved surface, and a nose, located intermediate the ends of said neck and projecting forwardly therefrom, said nose being provided, near its forward end, with a guideway substantially parallel with said neck, a pickup finger reciprocably guided in said guideway and projectable beyond said nose in a direction away from said saddle, said bracket being provided with a second guideway open at one end and substantially parallel with said first-named guideway, and with a passage, elongated in the direction of projection of said neck, providing communication between said guideways, a plunger guided for reciprocation in said second guideway, a plug for closing the open end of said second guideway, a spring confined between said plug and said plunger, said neck being provided with a slot, opening through its rear wall into said second guideway and elongated in the direction of length of said neck, means located in said passage and providing an operative connection between said plunger and said pickup finger, a slide, and means located in said slot and providing an operative connection between said slide and said plunger, said slide being provided with a finger hook located near said saddle.

4. The attachment of claim 3 including means for attaching a reel to the forward face of that portion of said neck located beyond said nose.

5. The attachment of claim 3 in which said second guideway opens through said curved surface of said saddle.

6. A spinner-type fishing reel including a base, means for connecting said base to a fishing rod, journal means supported on said base upon an axis coplanar with the axis of such a rod, a spool supported on said journal means for rotation about the axis of said journal means, said spool being provided with two axially-spaced, radially-extending flanges defining therebetween a line channel, the peripheral region of that flange more remote from said base being formed to provide a radially short, peripherally continuous surface substantially parallel with said base and facing said other flange, and with a continuous annular surface inclined radially inwardly and toward the other of said flanges, said inclined surface originating at the root of said parallel surface, a pick-up finger, means providing a guideway cooperating with said finger to restrict the same to movement substantially radial with respect to said spool, and means for shifting said pick-up finger along said guideway into and out of cooperative, substantially engaging relation with said inclined surface, the end of said finger adjacent said remote flange being formed to provide a surface parallel with said inclined surface, an adjacent surface parallel with said base, and a further surface substantially perpendicular to said last-named surface, and projecting axially therefrom to overlie the outermost periphery of said remote flange.

RICHARD PATRICK HOKE.
WILLIAM EDWARD BROWN.

References Cited in the file of this patent

UNITED STATES PATENTS

| Number | Name | Date |
|---|---|---|
| 2,034,917 | Miller | Mar. 24, 1936 |
| 2,271,883 | Bannister | Feb. 8, 1942 |
| 2,327,469 | Teitsma | Aug. 24, 1943 |
| 2,380,213 | Boor | July 10, 1945 |
| 2,507,457 | Rix | May 9, 1950 |
| 2,514,345 | Small | July 4, 1950 |

FOREIGN PATENTS

| Number | Country | Date |
|---|---|---|
| 383,423 | Great Britain | Nov. 17, 1932 |
| 839,627 | France | Jan. 4, 1939 |